United States Patent [19]
Gibson

[11] Patent Number: 5,463,941
[45] Date of Patent: Nov. 7, 1995

[54] GARLIC PRESS

[75] Inventor: Jeremy H. Gibson, Eastlake, Ohio

[73] Assignee: Faye Chen, Ann Arbor, Mich.

[21] Appl. No.: 343,132

[22] Filed: Nov. 22, 1994

[51] Int. Cl.⁶ .............................. A47J 19/06; B30B 9/02; B30B 9/06; B30B 15/00
[52] U.S. Cl. ............................ 99/495; 99/508; 100/112; 100/125; 100/234; D7/666
[58] Field of Search ............................ 99/495, 506, 508; 100/112, 125, 234, 99, 116, 243; D7/665, 666

[56] References Cited

U.S. PATENT DOCUMENTS

| | | | |
|---|---|---|---|
| D. 350,261 | 9/1994 | Ahner | D7/666 |
| 2,776,616 | 1/1957 | Sarossy | 100/125 |
| 3,327,621 | 6/1967 | Zysset | 100/125 |
| 4,466,346 | 8/1984 | Gemelli | 99/495 |
| 4,545,299 | 10/1985 | Ahner | 99/495 |
| 4,582,265 | 4/1986 | Petronelli | 99/495 |
| 4,794,854 | 1/1989 | Swaim | 99/495 |
| 5,101,720 | 4/1992 | Bianchi | 100/112 |
| 5,165,335 | 11/1992 | Bianchi | 99/495 |
| 5,303,640 | 4/1994 | Gaber et al. | 99/495 |
| 5,370,044 | 12/1994 | Lackie | 99/495 |

*Primary Examiner*—Timothy E. Simone
*Attorney, Agent, or Firm*—Frank B. Robb; Robb & Robb

[57] ABSTRACT

A press for garlic which does not require the clove to be separated and peeled, effecting the pressing operation without orienting the clove in the press, subsequently permitting the mechanism to automatically open when pressure is released, permitting removal of the remains.

Cleaning the parts is simple because of the open construction and ease of washing the parts when in open position.

18 Claims, 2 Drawing Sheets

GARLIC PRESS

BACKGROUND OF THE INVENTION

The present invention generally relates to handheld presses used to hold and press garlic and other food articles.

The utility of any type of food preparation utensil or device depends, not only upon how well it operates, but also upon the extent to which the food article must first be readied or arranged before it is suitable for use by the utensil or device and the extent to which the utensil or device must be cleaned or adjusted after each such use. Therefore, the utility of a food preparation utensil or device is directly dependent upon the amount of work or activity required of its user before and after the actual operation, in addition to during the operation.

While conventional handheld garlic presses are able to effectively press garlic or other food articles, they require that the food article, like a clove of garlic, be first peeled and separated into smaller sections and correctly positioned, or oriented, in the press for the press to operate properly. In addition, after each use the press must be manually opened and cleaned of the remnants of the garlic, or other food article, just pressed before the press can be reused. This additional work is time consuming and, therefore reduces the effectiveness and utility of the utensil or device.

Consequently, a need exists for improvement in garlic presses which improvement would eliminate the drawbacks associated therewith.

SUMMARY OF THE INVENTION

The present invention provides a garlic press which satisfies the aforementioned needs.

Accordingly, an object of the present invention relates to a garlic press which comprises a presser unit having a downward connecting frame and a bearing unit pivotally connected to the presser unit such that the garlic press can be opened and closed by pivoting the presser unit and the bearing unit. A bearing plate having a plurality of open spaces therethrough is pivotally connected at the same pivot point to the presser unit and the bearing unit. A presser plate is pivotally connected to the downward connecting frame of the presser unit such that when the presser unit and the bearing unit are pivoted to close the garlic press the presser plate is forced to press against the bearing plate with the presser plate being maintained at a suitable angular position. A control device is pivotally connected to the downward connecting frame of the presser unit such that when the presser unit and the bearing unit are pivoted to open the garlic press, the control device can be manipulated to turn the bearing plate outward and allow for cleaning of the garlic press.

BRIEF DESCRIPTION OF THE DRAWINGS

Further features of the present invention will become apparent to those skilled in the art to which the present invention relates from reading the following specification with reference to the accompanying drawings in which.

DESCRIPTION OF THE PREFERRED EMBODIMENT

Figure 1:
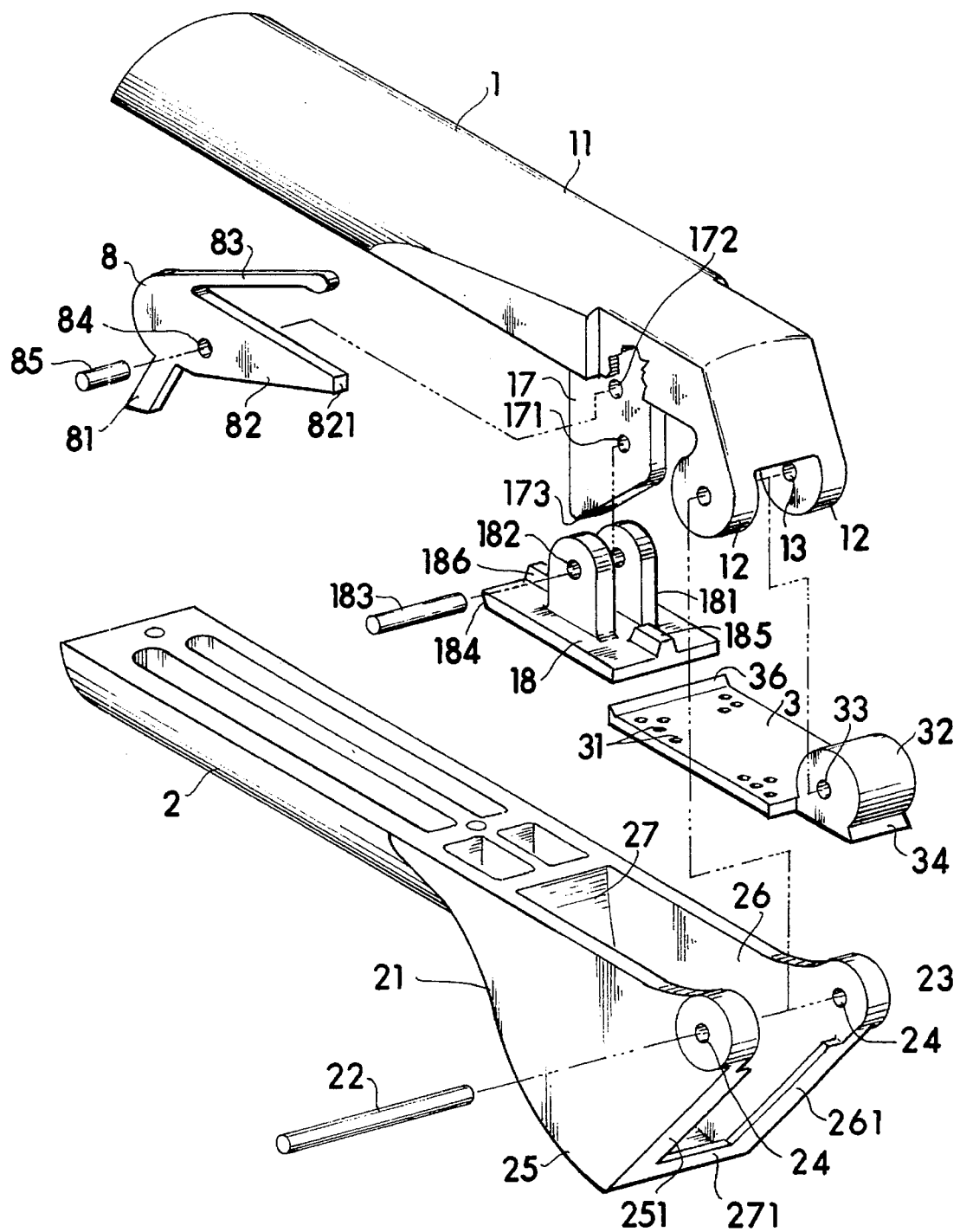
FIG. 1 is an exploded view of a garlic press according to the present invention.

Referring now to the drawings and more particularly FIG. 1, there is shown a garlic press of the present invention generally comprising a presser unit 11, a presser plate 18, a bearing unit 21, a bearing plate 3 and a control device 8. The presser unit 11 has one end terminating in an elongated handle 1 and the other end terminating in a pair of downward lugs 12. A downward connecting frame 17 is located behind the pair of downward lugs 12. Each of the downward lugs 12 has a downward lug pivot hole 13 which is aligned with each other. The downward connecting frame 17 has two vertically spaced pivot holes, namely, the lower pivot hole 171 and the upper pivot hole 172. The downward connecting frame 17 further has a projecting portion 173 at the bottom thereof. The bearing unit 21 has one end terminating in an elongated handle 2 and an opposite end terminating in a pair of upward lugs 23. Each of the upward lugs 23 has an upward lug pivot hole 24 aligned with each other. The bearing unit 21 further has two parallel side walls 25 and 26, respectively, and a bottom wall 27 at the bottom thereof. Elongated inside flanges 251, 261 and 271 are respectively made on the side walls 25 and 26 and the bottom wall 27. The bearing plate 3 has a front block 32 with a front block pivot hole 33 transversely disposed therethrough. The front block 32 of the bearing plate 3 has a front flange 34. The bearing plate 3 further has a plurality of open spaces 31 extending therethrough and an upward bevel flange 36 transversely raised from the rear end thereof. The presser plate 18 has two upright lugs 181 each having a upright lug pivot hole 182 aligned with each other. The presser plate 18 further has a front stop block 185 and a rear stop block 186 longitudinally aligned, and a bevel edge 184 transversely disposed along the rear end thereof. The control device 8 has a suspension arm 82 with a front end 821 and a control device pivot hole 84 on the rear end. A finger rod 81 and a spring rod 83 extend from the rear end of the suspension arm 82 at two opposite sides.

The presser unit 11, the bearing unit 21 and the bearing plate 3 are pivotally connected at the same pivot point. The presser unit 11 at the downward lugs 12 is pivotally connected to the bearing unit 21 at, and between, the upward lugs 23 while the bearing plate 3 is pivotally connected at, and between the downward lugs 12 of the presser unit 11. This pivot connection is made by pivot pin 22 which is inserted through the upward lug pivot holes 24 of the bearing unit 21, the downward lug pivot holes 13 of the presser unit 11 and the front block pivot hole 33 of the bearing plate 3. The garlic press can be opened and closed by pivoting the presser unit 11 and the bearing unit 21. The downward connecting frame 17 is pivotally connected at, and between, the upright lug pivot holes 182 of the presser plate 18 by pivot pin 183 which is inserted through the upright lug pivot holes 182 of the presser plate 18 and the lower pivot hole 171 of the downward connecting frame 17. The control device 8 is pivotally connected to the downward connecting frame 17 by pivot pin 85 which is inserted through control device pivot hole 84 of the control device 8 and the upper pivot hole 172 of the downward connecting frame 17. The bearing plate 3 pivots into and is held in a receiving space defined by the side walls 25 and 26 and the bottom wall 27 of the bearing unit 21. Elongated inside flanges 251, 261 and 271 stop the bearing plate 3 from moving out of the bearing unit 21 when the garlic press is operated.

Figure 2:
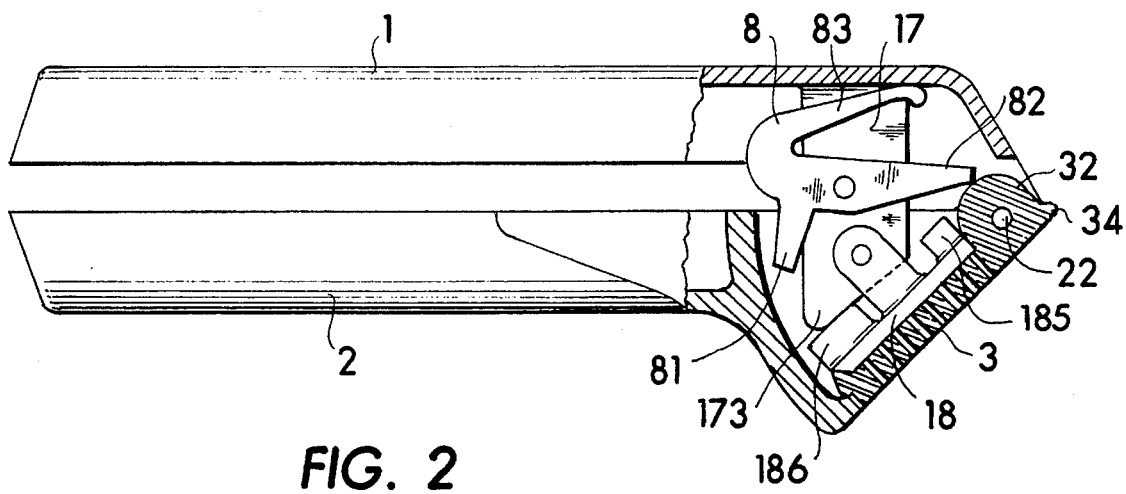
FIG. 2 is a side view in section showing the garlic press closed.

Referring now to FIG. 2, the garlic press of the present invention is shown in the closed position. When operating the garlic press, the garlic clove or other food article to be pressed is placed between the presser plate 18 and the bearing plate 3. As the garlic press is closed to start the pressing action, the presser unit 11 and the downward connecting frame 17 of the presser unit 11 pivots and forces the presser plate 18 to press against the bearing plate 3. The bevel edge 184 of the presser plate 18 is side-matched with the upward bevel flange 36 of the bearing plate 3. The projecting portion 173 of the connecting frame 17 of the presser unit 11 moves over the front stop block 185 and the rear stop block 186 of the presser plate 18 which keeps the presser plate 18 maintained at a suitable angular position when operating the garlic press in the process of crushing the garlic clove or other food article. The crushed garlic or other food article and its juices are forced through the plurality of open spaces 31 in the bearing plate 3 and out of the garlic press. The spring rod 83 of the control device 8 stops against the inside wall of the presser unit 11 to produce a spring force enabling the control device 8 to return to its former position after each pressing operation.

Figure 3:
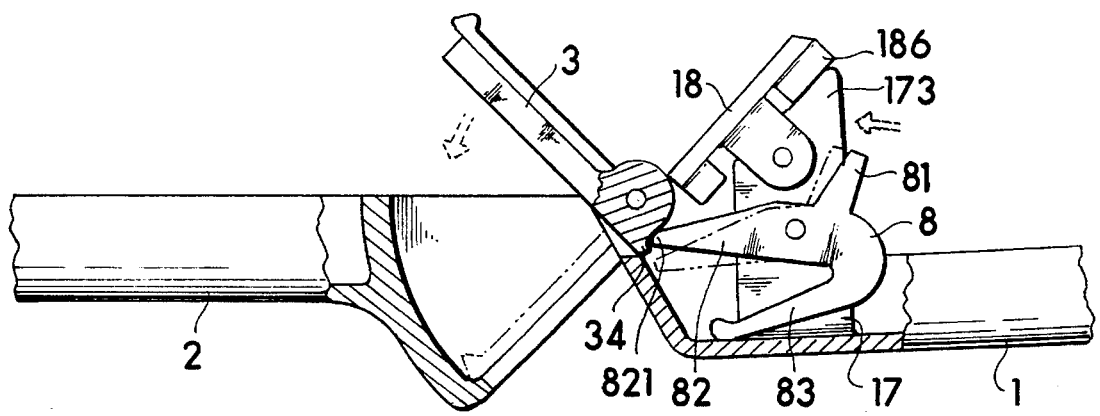
FIG. 3 is a side view in section showing the garlic press opened.

Referring now to FIG. 3, the garlic press of the present invention is shown in the opened position. As the garlic press is opened, the presser unit 11 and the connecting frame 17 pivot away from the bearing unit 21. As the connecting frame 17 moves, control device 8, which is pivotally connected to the connecting frame 17, also pivots. The front end 821 of the suspension arm 82 of the control device 8 pushes the front flange 34 on the front block 32 of the bearing plate 3 causing the bearing plate 3 to turn outwards allowing the inside of the bearing unit 21 to be conveniently cleaned. After cleaning the garlic press, the bearing plate 3 is released from the control device 8 by simply pulling the finger rod 81 to release the front end 821 of the suspension arm 82 from the front flange 34 of the front block 32 of the bearing plate 3. The bearing plate 3 then automatically turns back inside of the bearing unit 21.

What is claimed is:

1. A garlic press, comprising:

a presser unit having a downward connecting frame;

a bearing unit pivotally connected to said presser unit such that said garlic press can be opened and closed by pivoting said presser unit and said bearing unit;

a bearing plate having a plurality of open spaces therethrough and pivotally connected at the same pivot point to said presser unit and said bearing unit;

a presser plate pivotally connected to said downward connecting frame of said presser unit such that when said presser unit and said bearing unit are pivoted to close said garlic press said presser plate is forced to press against said bearing plate with said presser plate being maintained at a suitable angular position when operating said garlic press; and a control device pivotally connected to said downward connecting frame of said presser unit such that when said presser unit and said bearing unit are pivoted to open said garlic press said control device can turn said bearing plate outward and allow for cleaning of said garlic press.

2. The garlic press of claim 1, further comprising:

said bearing unit having two parallel side walls and a bottom wall; and elongated inside flanges respectively made on the said side walls and said bottom wall of said bearing unit defining a receiving space to hold said bearing plate and such that said bearing plate is stopped from moving out of said bearing unit when said garlic press is operated.

3. The garlic press of claim 1 further comprising:

a front stop block and a rear stop block longitudinally aligned on said presser plate.

4. The garlic press of claim 3 further comprising:

said downward connecting frame of said presser unit has a projecting portion such that said projecting portion of said downward connecting frame moves over said front stop block and said rear stop block to keep said presser plate maintained at a suitable angular position when operating said garlic press.

5. The garlic press of claim 1 further comprising:

a suspension arm on said control device, said suspension arm having front and rear ends; and a finger rod and a spring arm extending from said rear end of said suspension arm at two opposite sides.

6. The garlic press of claim 5 further comprising:

said bearing plate having a front block, said front block has a front flange such that said front end of said suspension arm of said control device pushes said front flange causing said bearing plate to turn outwards allowing the inside of said bearing unit to be conveniently cleaned.

7. The garlic press of claim 6 wherein said bearing plate is released from said control device by pulling said finger rod to release said front end of said suspension arm from said front flange of said front block of said bearing plate such that said bearing plate then automatically turns back inside of said bearing unit.

8. The garlic press of claim 5 wherein said spring rod of said control device stops against the inside wall of said presser unit such that a spring force is produced enabling said control device to return to its former position after each pressing operation.

9. The garlic press of claim 1 further comprising:

said bearing plate having an upward bevel flange transversely raised from the rear end thereof; and said presser plate having a bevel edge transversely disposed along the rear end thereof, such that said bevel edge of said presser plate is side-matched with said upward bevel flange of said bearing plate.

10. A garlic press, comprising:

a presser unit having first and second ends, said first end terminating in an elongated handle and said second end terminating in a pair of downward lugs each of said downward lugs having a downward lug pivot hole aligned with each other, said presser unit having a downward connecting frame, said downward connecting frame having lower and upper pivot holes;

a bearing unit having first and second ends, said first end terminating in an elongated handle and said second end terminating in pair of upward lugs each of said upward lugs having an upward lug pivot hole aligned with each other, said bearing unit pivotly connected at said upward lugs to said presser unit at said downward lugs such that said garlic press can be opened and closed by pivoting said presser unit and said bearing unit;

a bearing plate having a front block, said front block having a front block pivot hole transversely disposed therethrough, said bearing plate pivotly connected to said presser unit at said downward lugs and said bearing unit at said upward lugs such that said presser unit, said bearing unit and said bearing plate are pivotally connected at the same pivot point;

a presser plate having a pair of upright lugs each of said upright lugs having an upright lug pivot hole aligned with each other, said presser plate pivotally connected at said upright lug pivot hole to said downward connecting frame of said presser unit at said lower pivot hole such that when said presser unit and said bearing unit are pivoted to close said garlic press said presser plate is forced to press against said bearing plate with said presser plate being maintained at a suitable angular position; and a control device having a suspension arm, said suspension arm having front and rear ends, said rear end of said suspension arm having a control device pivot hole, said control device pivotally connected at said control device pivot hole to said downward connecting frame of said presser unit at said upper pivot hole such that when said presser unit and said bearing unit are pivoted to open said garlic press said control device can turn said bearing plate outward and allow for cleaning of said garlic press.

11. The garlic press of claim 10, further comprising:

said bearing unit having two parallel side walls and a bottom wall; and elongated inside flanges respectively made on the said side walls and said bottom wall of said bearing unit defining a receiving space to hold said bearing plate and such that said bearing plate is stopped from moving out of said bearing unit when said garlic press is operated.

12. The garlic press of claim 10 further comprising:

a front stop block and a rear stop block longitudinally aligned on said presser plate.

13. The garlic press of claim 12 further comprising:

said downward connecting frame of said presser unit has a projecting portion such that said projecting portion of said downward connecting frame moves over said front stop block and said rear stop block to keep said presser plate maintained at a suitable angular position when operating said garlic press.

14. The garlic press of claim 10 further comprising:

said suspension arm having front and rear ends; and a finger rod and a spring arm extending from said rear end of said suspension arm at two opposite sides.

15. The garlic press of claim 14 further comprising:

said bearing plate having a front block, said front block has a front flange such that said front end of said suspension arm of said control device pushes said front flange causing said bearing plate to turn outwards allowing the inside of said bearing unit to be conveniently cleaned.

16. The garlic press of claim 15 wherein said bearing plate is released from said control device by pulling said finger rod to release said front end of said suspension arm from said front flange of said front block of said bearing plate such that said bearing plate then automatically turns back inside of said bearing unit.

17. The garlic press of claim 14 wherein said spring rod of said control device stops against the inside wall of said presser unit such that a spring force is produced enabling said control device to return to its former position after each pressing operation.

18. The garlic press of claim 10 further comprising:

said bearing plate having an upward bevel flange transversely raised from the rear end thereof; and said presser plate having a bevel edge transversely disposed along the rear end thereof, such that said bevel edge of said presser plate is side-matched with said upward bevel flange of said bearing plate.

* * * * *